UNITED STATES PATENT OFFICE.

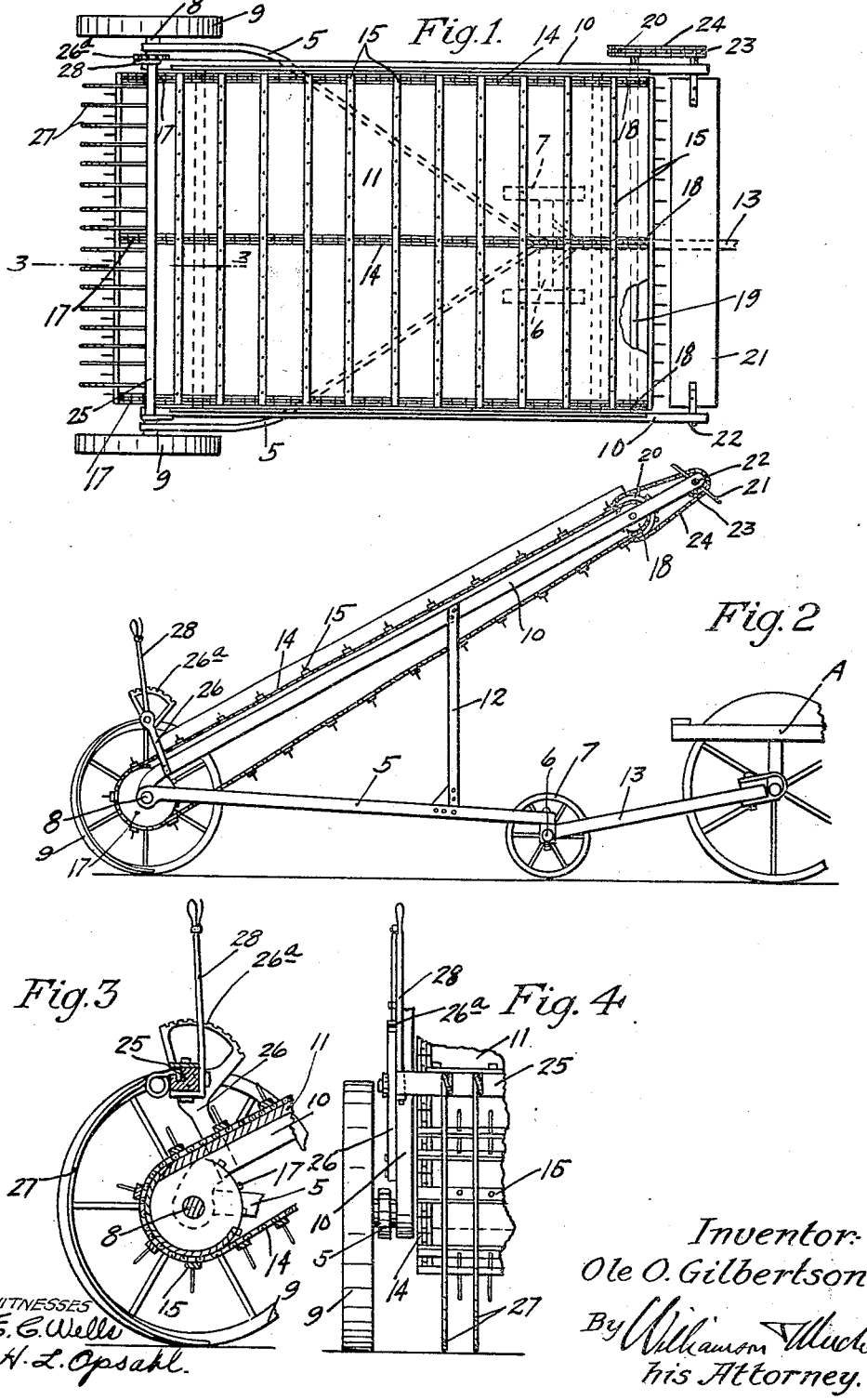

OLE O. GILBERTSON, OF HAYFIELD, MINNESOTA.

HAY-LOADER.

1,283,494.  Specification of Letters Patent.  Patented Nov. 5, 1918.

Application filed April 14, 1917. Serial No. 161,977.

*To all whom it may concern:*

Be it known that I, OLE O. GILBERTSON, a citizen of the United States, residing at Hayfield, in the county of Dodge and State of Minnesota, have invented certain new and useful Improvements in Hay-Loaders; and I do hereby declare the following to be a full, clear, and exact description of the invention, such as will enable others skilled in the art to which it appertains to make and use the same.

My invention has for its object to provide an extremely simple and highly efficient hay loader adapted to be drawn at the rear of a hayrack to pick up hay and deliver the same onto the rack.

The improved loader is illustrated in the accompanying drawings wherein like characters indicate like parts throughout the several views.

Referring to the drawings,

Figure 1 is a plan view of the improved hay loader;

Fig. 2 is a side elevation of the loader shown as attached to the rear of a rack-equipped wagon;

Fig. 3 is a section taken approximately on the line 3—3 of Fig. 1, some parts being broken away; and Fig. 4 is a rear elevation of the parts shown in Fig. 3, some parts being broken away.

The truck of the loader comprises a triangular frame 5, a short front axle 6 equipped with front wheels 7, and a rear axle 8 equipped with rear wheels 9.

A rearwardly inclined superframe structure 10 which has a deck 11 is carried by the truck frame 5 being, as shown, directly connected at the rear to the rear axle 8, and at the intermediate portion of its sides, having depending legs 12 that are attached to the sides of the frame 5.

The front axle 6 has a short tongue 13 that is adapted to be suitably attached to the rear portion of a rack-equipped wagon or vehicle indicated as an entirety by the character A in Fig. 2.

An endless elevating belt or carrier made up of sprocket chains 14 and transverse toothed slats 15, runs over the apron 11. The chains 14 run on lower sprockets 17 and upper sprockets 18. The said lower sprockets 17 are secured to the rear axle 8 and the latter is driven by the rear wheels 9. The upper sprockets 18 are carried by a shaft 19 journaled in the upper side portions of the supplemental frame 10 and provided at one projecting end with a sprocket 20. A rotary beater in the form of a flat blade 21 works at the extreme upper portion of the elevator belt, and serves to clear the teeth of the slats 15 from hay and to throw the hay upward and forward onto the rack of the vehicle A. This blade 21 is provided at its ends with trunnions 22, one of which projects and is provided with a sprocket 23 over which and the sprocket 20 a short sprocket chain 24 is arranged to run.

An oscillating bar or shaft 25 is located substantially directly above the axle 8, and at its ends, this bar is journaled in brackets 26 rigidly secured to the sides of the lower portion of the supplemental frame 10. This bar 25 affords a rake head to which approximately semi-circular spring-acting rake tines 27 are firmly attached at their upper ends. The lower ends of rake tines 27 will quite closely engage the ground when they are thrown downward, as shown in Fig. 3, and in this position, it will be further noted that the said curved tines 27 then extend approximately concentric to the axis of the axle 8.

Near one end, the oscillating bar 25 is provided with a latch lever 28 that is adapted to coöperate with a latch arch 26ª formed as a part of one of the brackets 26.

When the rack-equipped wagon A and the loader are drawn forward, the tines 27 will gather up the hay from the ground and deliver the same to the teeth of the slats 15 so that, by the latter, the hay will be carried on upward over the deck 11 to the extreme upper portion of the said elevator belt. At this point, the rotary beater 21 will strip the hay from the teeth of the slats 15 and throw the same forward onto the rack.

When the loader is not being used to pick up hay from the field, the rake may be raised pivotally out of operative position. When in operation, the rake may be adjusted nearer to or farther from the upwardly moving adjacent portion of the elevator belt, so as to properly adjust the machine for taking up any desired amount of hay. Of course, if the hay is thin on the ground, the rake would be more closely adjusted to the elevator belt than when the hay is thick upon the ground. Such adjustment of the rake makes it possible to always press the hay tightly against the toothed slats of the elevator belt. The flat blade 21 has a combined beating and feeding action which tends to throw the hay upward and forward and cause the same to clear the said member 21 and thereby prevent the hay from getting wound about the said blade 21. Otherwise stated, the hay does not rest constantly on this flat feed blade as it will upon a roller or a shaft provided with a large number of blades, but the hay is fed with a sort of an intermittent or jumping action.

The loader, while of simple construction and small cost, is efficient for the purposes had in view.

What I claim is:

In a hay loader, the combination with a carrying truck and a rearwardly inclined supplemental frame carried thereon, said supplemental frame having an inclined deck, an endless elevator belt working over said deck, a means on said truck and supplemental frame for guiding and driving said elevator belt, and a rotary beater in the form of a flat blade, driven from said elevator belt, and working at the upper delivery portion of said elevator belt and serving to strip the hay therefrom.

In testimony whereof I affix my signature in presence of two witnesses.

OLE O. GILBERTSON.

Witnesses:
G. F. WESTCOTT,
G. S. MOGEN.

Copies of this patent may be obtained for five cents each, by addressing the "Commissioner of Patents, Washington, D. C."